July 24, 1951     D. W. FENTRESS     2,561,351
COUPLING STRUCTURE
Filed Oct. 5, 1944     2 Sheets—Sheet 1
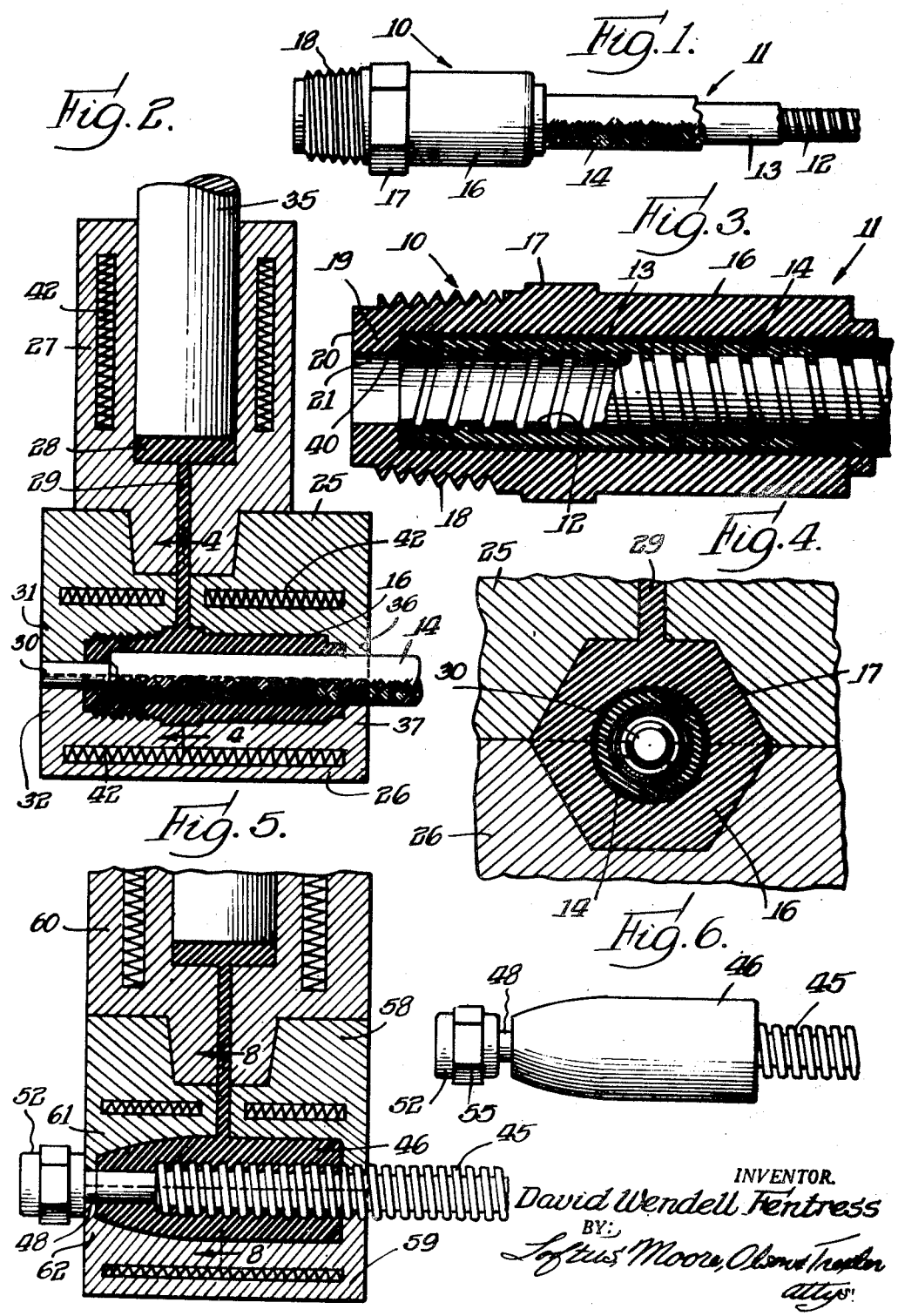
INVENTOR.
David Wendell Fentress

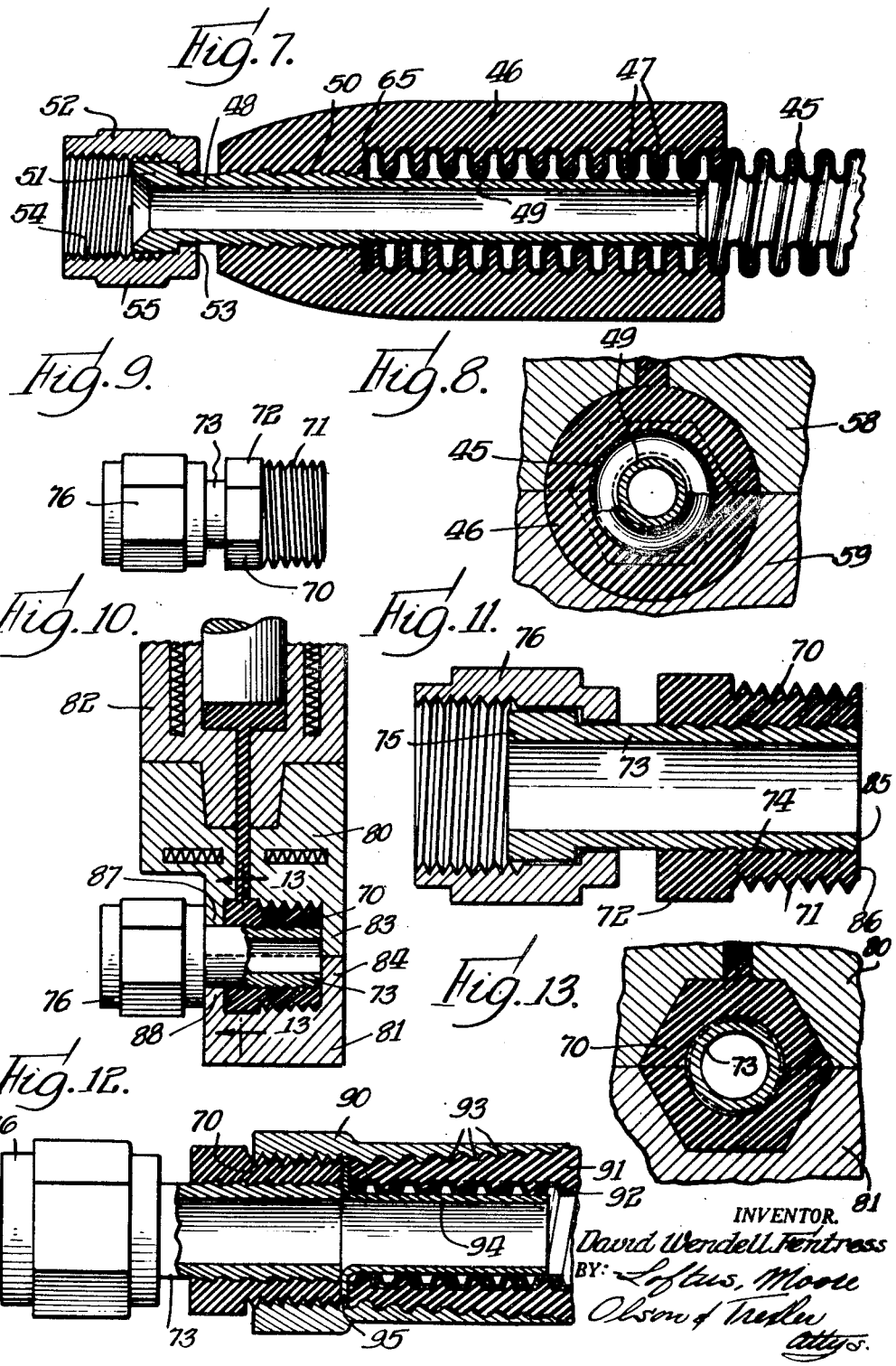

Patented July 24, 1951

2,561,351

UNITED STATES PATENT OFFICE 2,561,351

COUPLING STRUCTURE

David Wendell Fentress, Barrington, Ill., assignor to Chicago Metal Hose Corporation, Maywood, Ill., a corporation of Illinois Application October 5, 1944, Serial No. 557,255

6 Claims. (Cl. 285—72)

This invention relates to coupling structures and to methods of manufacture and assembly thereof, and concerns particularly molded couplings and means and methods for fabricating and assembling them upon hose, tubings, and the like.

It is an object of the invention to provide improved and simplified coupling or hose fitting structures, and to provide improved and simplified methods for fabricating and assembling coupling and fitting elements upon hose, tubings and like tubular bodies. More specifically stated, it is an object of the invention to provide an improved molded coupling or fitting structure, and for its fabrication and mounting upon hose, tubing, or the like.

Further objects of the invention are to provide a coupling structure of the type defined having improved mechanical strength and gripping engagement with the hose or tubular body to which the coupling is to be attached; and wherein the coupling is leak-proof, provides for the elimination of gaskets, and is adapted for application to various types and kinds of tubing side wall and end structures.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is an assembly view, in side elevation, of a hose coupling or fitting, and associated hose structure, as constructed in accordance with one preferred illustrative embodiment of the invention;

Fig. 2 is an illustrative view showing the method and apparatus for fabricating and assembling the coupling and hose structure of Fig. 1;

Fig. 3 is a longitudinal sectional view, on an enlarged scale, of the structures shown in Fig. 1;

Fig. 4 is a vertical sectional view of the structure of Fig. 2, on an enlarged scale and taken as indicated by the line 4—4 thereof;

Fig. 5 is a view similar to Fig. 2, but illustrating the method of fabricating and assembling the coupling, in accordance with a modified structural form;

Fig. 6 is an assembly view of the coupling and associated hose, as constructed in accordance with the structure of Fig. 5;

Fig. 7 is a longitudinal sectional view, on an enlarged scale, of the structure of Fig. 6;

Fig. 8 is a vertical sectional view of the structure of Fig. 5 on an enlarged scale and taken as indicated by the line 8—8 thereof;

Fig. 9 is a side elevational view of a coupling structure, as constructed in accordance with a still further modified form;

Fig. 10 is an illustrative view showing the method of fabricating the structure of Fig. 9, in accordance with the principles of the invention;

Fig. 11 is a longitudinal sectional view, on an enlarged scale, of the coupling or fitting structure of Fig. 9;

Fig. 12 is a view of the coupling of Figs. 9–11, showing its manner of connection with additional hose elements; and Fig. 13 is a vertical sectional view of the structure of Fig. 10 taken on an enlarged scale and as indicated by the line 13—13 thereof.

Hose couplings now in common use are of two general types: Mechanical, and welded or soldered. Mechanical couplings are generally of multiple part construction, involving the interfitting of machined parts. Such constructions are frequently costly to build and assemble, and generally necessitate the deformation of the hose or tubing wall structures to which they are to be secured, in order to provide a connection of requisite fluid-tightness and mechanical strength. In instances wherein the tubing is provided with braid, further difficulties, involving the provision of additional coupling parts, are presented in order to provide for securing the braid properly in position in the assembly. Welded or soldered coupling connections are also frequently inadequate to meet the requirements of coupling installations. The high heat, incident to the assembling of a welded coupling structure, may deteriorate the hose parts, as for example where they include rubber or other non-metallic wall structures. Soldered couplings may be applied at lowered temperatures, but the flux used in connection with the soldering operations may unduly etch the tubing walls, with resulting corrosion, which is disadvantageous and particularly in the case of thin-walled tubing. Also, the provision of solder, being dissimilar to the metal which may be included in the hose or tubing, in certain instances sets up an undesirable electrolytic action when the tubing is in use under service conditions.

In accordance with the present invention the difficulties incident to the use of mechanical or welded or soldered coupling connections are eliminated; satisfactory means and methods being provided, hereinafter to be more specifically set forth, whereby the coupling or fitting may be molded directly upon the hose, tubing, or other tubular body to which it is to be secured, whereby to provide a mechanically strong and fluid-tight coupling connection. The molded coupling or fitting structure of the present invention provides an essentially one piece construction, having an intimate mechanical and fluid-tight bond with the hose or supporting tubular body. As will later appear, the coupling structure may be readily adapted for different types of hose or tubular bodies, in accordance with the construction and shaping thereof, and fluid-tightness may be readily insured regardless of the fact that the tubing may be irregular or ragged in its end wall portions.

Referring more specifically to the drawings, and first to the structural embodiment illustrated in Figs. 1 to 4 inclusive, the hose and coupling structure shown in Fig. 1 comprises a coupling or fitting member, generally indicated by the numeral 10 secured to the end of a hose or tubing structure generally indicated by the numeral 11. As best shown in Fig. 3, the hose structure 11 in this instance more specifically comprises a central core member 12 in the form of a profiled, helically wound metal strip, the edges of which are in interconnected engagement. Formed around the metal core 12 is a wall structure 13 of non-metallic material, for example natural or synthetic rubber; and around the wall 13, in the particular embodiment illustrated, is a metal braid 14, in embracing relation with the wall structure. The coupling or fitting member 10 comprises an integral, one piece, molded structure, molded directly onto the hose, thus forming an integral end fitting or coupling structure. The coupling member is of molded plastic material, and may preferably comprise a high impact synthetic resin, such for example as phenol formaldehyde with or without suitable filler material such for example as cloth fibers, powdered wood or the like. As shown, the coupling element comprises an elongated body portion 16 molded into firm embracing relation with the hose, a polygonally formed portion 17 adapted to facilitate the application of wrenches or the like to the assembly for the purpose of securing it to co-mating coupling elements, and an exteriorly threaded portion 18 adapted for interlocking threaded engagement with such co-mating coupling elements or the like. An inturned flange portion 19 is formed on the extreme end of the coupling element to finish off the end of the hose and provide a smooth face portion 20 to effect sealing engagement with any suitable cooperative member to which the coupling structure may be applied. The bore 21 of the flange portion 19 is in line with the bore of the hose or tubing and forms a continuation thereof, as will be understood.

In accordance with the invention, the molded synthetic plastic material of which the coupling element 10 is formed is preferably of the thermosetting type, and is transfer molded upon the hose end. Means and methods for effecting this operation are illustrated in Figs. 2 and 4. As shown, a split die structure comprising upper and lower die members 25 and 26 is provided, the die member 25 having press-fitted into its upper portion a receptacle member 27 provided with a cavity or chamber portion 28 into which the plastic material of which the coupling is to be formed is adapted to be placed. An elongated orifice or passage 29 communicates the reservoir or chamber 28 with the mold cavity formed between the die members 25 and 26 and into which the hose end is adapted to be placed. A pin 30 is arranged between the die members, at one end thereof. This pin may be a separate element, held in position between reduced cooperative semicylindrical portions or parts 31 and 32 of the die members, when they are in cooperative engagement, or the pin may be permanently fixed to one of the die portions, as desired.

In forming the coupling structure the hose end is placed in the mold cavity between the cooperative dies, the pin 30 being engaged into the end of the hose bore to position the hose concentrically within the mold cavity, and also to seal off the hose bore from the plastic material. The plastic material, in either powder or slug form, is then introduced into the reservoir 28, sufficient heat, and pressure by means of a receptacle plunger 35, are then applied to render the plastic material liquid, the material then being forced by the plunger from the reservoir 28 through the orifice 29 and into the mold cavity between the die members 25 and 26 to form the coupling structure. During this transfer molding operation the fluid plastic material is forced into firm gripping engagement with the hose wall, and specifically in the embodiment illustrated into the interstices of the wire braid 14, whereby when the thermosetting plastic material is permittted to set or be transformed to solid state, a firm and mechanically strong interlocking connection between the hose and the coupling member is provided. During the formation of the coupling, the die portions 36 and 37 will tightly grip the hose wall limiting the flow of the plastic material to the right as seen in Fig. 2, whereby to define the inner margin or end of the coupling to be formed. The die portions 36 and 37 also prevent the tubing from moving axially. The pin 30 prevents flow of the plastic material into the hose bore, and also defines the surface 21, Fig. 3, of the coupling flange portion 19. The mold cavity between the die members 25 and 26 is so shaped as to form the screw threads 18 and polygonal portion 17 of the coupling, simultaneously with the formation of the main coupling body portion. The coupling structure is thus formed with the necessary screw threaded and wrench engaging appurtenances simultaneously with the application of the coupling to and its securing upon the nose end. After the molded plastic material has been permitted to set, or solidify, the die members may be opened and the sprue within the orifice or passage 29 broken off, and ground, if desired, to finish the coupling structure.

In accordance with the structure set forth, the molded coupling is thus formed and secured to the hose end in a unitary operation. A connection between the hose wall and the coupling body is provided which is not only mechanically strong but also which is fluid-tight even when the coupling structure is subjected to pressure and the action of searching fluids. As the coupling is formed, the ragged hose ends, for example as indicated at 40 in Fig. 3, are automatically enclosed and sealed off, and a smooth end face 20 substituted therefor, which may be readily sealed against a cooperative coupling element or structure. Gaskets between the hose and coupling body are eliminated, the plastic in effect constituting its own gasket material. The coupling, though of one piece structure, effectively grips and seals all portions of the hose, including the braid, and in effect forms an integral structure with the hose end.

Preferably the temperature of the synthetic plastic material is maintained as low as possible, during the transfer molding process, whereby to minimize possible injury to the hose, such for example as to the rubber wall structure 13. By this means the coupling may be applied to hose or tubing structures which include readily frangible portions or walls, without damage to the hose resulting, for example, from extreme or undue heat. The transfer molding process is particularly adapted to apply a uniform inward radial pressure against the hose during the molding operation. This uniform pressure enables the metal hose core 12 to resist compression, whereby to maintain the hose end undamaged or unmashed during the molding processing.

To heat the plastic to effect the transfer molding, electric resistance heating elements as indicated at 42 may be provided in die members 25 and 26 and in the reservoir member 27, or any other suitable heating means may be employed.

In Figs. 5 to 8 inclusive a modified form of structure is illustrated. In this instance, as best shown in Fig. 7, the hose 45 is of the spiral corrugated type, and the coupling member 46 molded thereon has portions 47 extending into interlocked engagement with the spiral convolutions of the hose. By this means it will be seen that a positive mechanical interengagement between the coupling member and the hose convolutions is provided, rendering the structure strongly resistant to end shear stresses, as well as fluid-tight.

As also best shown in Fig. 7, in this structure a sleeve or tubular conduit or hose member 48 is disposed within the coupling body, and has a reduced end portion 49 extending into and longitudinally of the hose end for a predetermined distance. The sleeve 48 is provided with serrations 50, which may be of any desired shape or character, to provide positively mechanical interlocking connection with the coupling body 46; and the sleeve is also provided with an enlarged end portion 51 upon which is mounted a swivelled coupling nut 52. The coupling nut is provided with an inturned flange portion 53 interlocked with the enlarged sleeve section 51 in such a manner as to permit swivelled movement of the coupling nut while preventing axial withdrawal thereof. The coupling nut is provided with internal threads 54 in the particular embodiment illustrated, for attachment to a co-mating coupling element as may be desired, and with a polygonal portion 55 by means of which the nut may be turned by a wrench or the like.

As illustrated in Fig. 5, the molded coupling member 46, as illustrated in Figs. 5 to 8, may be formed by means generally similar to the structure previously described in reference to Figs. 2 and 4. More particularly, in this instance a pair of die members 58 and 59 and a reservoir member 60 are provided generally similar to the members 25, 26 and 27 previously described, the molding operation being effected by transfer molding as previously set forth. In this instance it will be seen that the sleeve or conduit member 48 cooperates with the die portions 61 and 62 thus centering the structure in the die mold cavity and performing the functions previously mentioned in reference to the pin 30.

The reduced end section 49 of the sleeve underlies the convolutions of the hose or tubing 45, thus providing a reinforcing support for the tubing convolutions during the molding operation. This auxiliary support arrangement may be desirable particularly in instances wherein the tubing is of thin-walled structure.

It will be seen that the molded coupling body 46 performs the function of a coupling element, being mechanically interlocked with the hose or tubing in a fluid-tight joint, while at the same time in no way mashing or otherwise distorting the tubing convolutions. The ragged end portions 65 of the tubing, difficult to seal even with the use of complicated gasket arrangements in conventional structures, are automatically encased and sealed within the coupling assembly. The molded body 46 also provides means for positively connecting the conduit sleeve 48 with the tubing 45, the serrations 50 and the tubing convolutions insuring a positive mechanical connection. Still further, the coupling body 46 forms the means for holding the swivel nut 52 in position upon the end of the conduit or tubing sleeve.

In Figs. 9 to 13 inclusive a further structural embodiment is set forth for illustrative purposes. In this instance, as best shown in Fig. 11, the molded coupling body or element 70 provided with external screw threads 71 and a polygonal portion 72 is molded upon a conduit or tubing sleeve 73 in a manner similar to the parts 46, 48 in the structure of Fig. 7, serrations 74 being provided to insure a positive mechanical grip. The tubular sleeve 73 is provided with an enlarged end portion 75 upon which is mounted a swivelled coupling nut 76 similar in structure and purpose to the nut 52 in the structure of Fig. 7.

The structure may be fabricated by means generally similar to those previously described. Referring to Figs. 10 and 13, a pair of split die members 80 and 81 and a reservoir member 82 are shown, similar for example to the members 58, 59 and 60 of Fig. 5. The manner of forming the molded coupling is similar, except that in this instance the die portions 83 and 84 of the die members 80 and 81, respectively, form a complete end wall against which the end surface 85, Fig. 11, of the tubing or conduit member 73 may be abutted thereby to form the end surface 86 on the molded coupling member 70, and preventing the influx of the molded material into the bore of the sleeve member 73. The die portions 87 and 88 grip the sleeve 73 and hold it in proper centered position and against axial displacement within the die molding cavity.

The molded coupling body 70 forms a mechanically interlocked and fluid-tight connection with the conduit sleeve 73, similar to the arrangement of the parts 46, 48 of the structure of Fig. 7, and also locks the swivelled coupling nut 76 in position. However, in the structure of Fig. 11 the coupling body 70 is adapted for threaded engagement with additional hose elements, as best shown in Fig. 12. By way of illustration, the cupling body member 70 may have threaded interconnection with a sleeve member 90 crimped or pressed onto the wall portion 91 of a flexible tubing structure, comprising in addition to the flexible rubber wall 91, a flexible convoluted metal core structure 92. Serrations or undulations 93 may be formed on the sleeve 90 for positive connection with the hose wall 91. A metal sleeve 94 may be disposed within the hose bore at its end, said sleeve having an outwardly turned flange 95 adapted to abut the end surface 86 of the molded coupling body to form a fluid-tight connection therewith. The molded coupling body, forming its own gasket material, eliminates the necessity for a separate gasket member between the coupling body and the sleeve flange 95.

As will be undersood, the molded coupling body is non-corrosive, light in weight, and may be employed, for example in the structure of Fig. 1, to electrically insulate the metallic tubing.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A hose coupling structure comprising a tubular conduit structure, and a coupling element secured to the conduit structure, said coupling element being of molded plastic and said conduit structure comprising a tubular member and a coupling nut swivelly mounted on the tubular member, and said coupling element being molded upon the tubular member in embracing relation therewith, and serving to hold the swivelled nut against axial displacement and forming with said tubular member an integral and fluid-tight coupling assembly.

2. A hose coupling structure comprising a tubular conduit structure, and a coupling element secured to the conduit structure, said coupling element being of molded plastic and said conduit structure comprising a tubular member and a coupling nut swivelly mounted on the tubular member, the coupling nut and tubular member having cooperative flanges adapted to limit the axial movement of the coupling nut in one direction, and said coupling element being molded upon the tubular member in embracing relation therewith, and serving to hold the swivelled coupling nut against axial displacement in the opposite direction, and forming with said tubular member an integral and fluid-tight coupling assembly.

3. A hose coupling structure as defined in claim 1, wherein said tubular conduit structure comprises a length of one piece convoluted metal tubing into the convolutions of which the molded plastic is engaged.

4. A hose coupling structure comprising tubular conduit means including a hose body and an inner tubular conduit member telescoped within the hose body and projecting axially from the end thereof, the projecting end of said tubular conduit member having locking irregularities disposed along a substantial portion of the length thereof, and a coupling element of moldable plastic material pressure molded to engage said locking irregularities and also to engage said hose body substantially along the portion thereof surrounding said tubular conduit member for holding the same against relative axial displacement and forming a fluid tight coupling assembly.

5. A hose coupling structure as claimed in claim 4, wherein the hose body comprises convoluted metal tubing into the exteriorly open convolutions of which the plastic material of the coupling element is engaged to provide a mechanical interlock therewith.

6. The method of forming a hose coupling structure of the type including a hose conduit and a tubular coupling member telescoped therein and secured thereto by a plastic coupling element embracing the coupling member and the hose conduit; which method consists in telescoping the tubular coupling member within the end of the hose conduit to an extent sufficient to support the hose conduit thereon, embracing the hose conduit while leaving a portion of the tubular coupling member projecting axially beyond the end of the hose conduit, inserting the telescopically assembled tubular coupling member and adjacent end of the hose conduit within a mold cavity sealed at one end by engagement of mold parts with the projecting end of the tubular coupling member and sealed at the other end by engagement of mold parts with the exterior surface of the conduit body, injecting moldable plastic material into the mold cavity under heat and pressure to flow the same into binding engagement with the projecting portion of the tubular coupling member within the mold cavity and also into binding engagement with the exterior surface of the hose conduit within the mold cavity and with the inserted telescoped end of the tubular coupling member supporting the hose conduit substantially along the extent thereof embraced by the plastic material and acting as a supporting mandrel during molding of the coupling element on the assembled structure.

DAVID WENDELL FENTRESS.

REFERENCES CITED

The following references are of record in the file of this patent:

UNITED STATES PATENTS

| Number | Name | Date |
|---|---|---|
| Re. 21,006 | Brickman | Feb. 21, 1939 |
| 1,496,071 | Sample | June 3, 1924 |
| 1,928,837 | Loughead | Oct. 3, 1933 |
| 1,969,588 | Sweet | Aug. 7, 1934 |
| 1,982,732 | Fletcher | Dec. 4, 1934 |
| 2,074,770 | Brickman | Mar. 23, 1937 |
| 2,308,324 | Benander | Jan. 12, 1943 |
| 2,333,349 | Weatherhead | Nov. 2, 1943 |
| 2,378,901 | Amrheim et al. | June 26, 1945 |
| 2,411,398 | Wallace | Nov. 19, 1946 |

FOREIGN PATENTS

| Number | Country | Date |
|---|---|---|
| 305,135 | Italy | Jan. 27, 1933 |